(12) United States Patent
Toskala et al.

(10) Patent No.: US 8,027,317 B2
(45) Date of Patent: Sep. 27, 2011

(54) POINT-TO-MULTIPOINT TRANSMISSION OF LOCALIZED DATA

(75) Inventors: Antti Toskala, Espoo (FI); Johanna Pekonen, Espoo (FI); Karri Rantaaho, Espoo (FI)

(73) Assignee: Nokia Corporation, Espoo (FI)

( * ) Notice: Subject to any disclaimer, the term of this patent is extended or adjusted under 35 U.S.C. 154(b) by 1195 days.

(21) Appl. No.: 11/443,255

(22) Filed: May 31, 2006

(65) Prior Publication Data

US 2007/0206548 A1 Sep. 6, 2007

(30) Foreign Application Priority Data

Mar. 6, 2006 (EP) .................................... 06004511

(51) Int. Cl.
*H04J 3/00* (2006.01)
*H04W 4/00* (2009.01)
*H04W 72/00* (2009.01)
*H04W 40/00* (2009.01)

(52) U.S. Cl. ......... 370/336; 370/338; 455/451; 455/446

(58) Field of Classification Search .................. 370/328, 370/329, 336, 338; 455/414.1, 414.2, 414.3, 455/446, 447, 450, 456.1, 456.3, 451, 452.1, 455/452.2, 453
See application file for complete search history.

(56) References Cited

U.S. PATENT DOCUMENTS

| | | | | |
|---|---|---|---|---|
| 5,930,248 A | * | 7/1999 | Langlet et al. | 370/347 |
| 6,657,982 B1 | * | 12/2003 | Fong et al. | 370/336 |
| 6,728,550 B1 | * | 4/2004 | Bohnke et al. | 455/522 |
| 7,042,856 B2 | * | 5/2006 | Walton et al. | 370/329 |
| 2001/0022001 A1 | * | 9/2001 | Hiroi | 725/110 |
| 2003/0045314 A1 | * | 3/2003 | Burgan et al. | 455/524 |
| 2006/0104334 A1 | * | 5/2006 | Hervey et al. | 375/133 |
| 2006/0195576 A1 | * | 8/2006 | Rinne et al. | 709/226 |
| 2007/0135170 A1 | * | 6/2007 | Khan et al. | 455/562.1 |

* cited by examiner

*Primary Examiner* — Christopher M Brandt
(74) *Attorney, Agent, or Firm* — Squire, Sanders & Dempsey (US) LLP

(57) ABSTRACT

The present invention relates to a method, system, network element and computer program product for transmitting a data stream in a point-to-multipoint mode from a source entity to a plurality of users in a predetermined area of a cellular network, said predetermined area comprising a plurality of sub-areas. A predetermined, recurring time period is allocated to transmission of localized data specified for users of individual ones of said plurality of sub-areas, and a transmission capacity of the data stream is divided using said predetermined, recurring time period among adjacent sub-areas. Localized data is then transmitted during the predetermined, recurring time period using a divided transmission capacity allocated to the respective sub-area. Thereby, combination of global and local broadcast or multicast content is enabled in a broadcast system by avoiding overlapping of transmissions with different content at cell edges.

16 Claims, 2 Drawing Sheets

POINT-TO-MULTIPOINT TRANSMISSION OF LOCALIZED DATA

FIELD OF THE INVENTION

The present invention relates to a method, system, network element and computer program product for transmitting a data stream in a point-to-multipoint mode from a source entity to a plurality of users in a predetermined area of a cellular network. In particular, the present invention relates to—but is not restricted to—handling of local content for mobile broadcast/multicast transmission.

BACKGROUND OF THE INVENTION

The Universal Mobile Telecommunications System (UMTS) specified by the third generation partnership project (3GPP) shall offer appealing multimedia services. When many users want to receive the same multimedia services at the same time, like news services, even high bandwidth UMTS radio resources might run into shortage. Efficiency of resource allocation can be improved when many radio channels transfer data in parallel to different users within the same radio cell. A resource and therefore cost efficient delivery of multimedia services to a large number of users in parallel is given by broadcast or multicast services. As an example, 3GPP defined a Multimedia Broadcast and Multicast Service (MBMS) which shares network resources, specifically radio resources, when transferring data to many users in parallel. MBMS is an Internet Protocol (IP) datacast type of service that can be offered via existing cellular networks, such as Global System for Mobile Communications (GSM) or UMTS networks. The infrastructure gives the possibility to use an uplink channel for interactions between the service and the user. This is however not a straight forward issue in usual broadcast networks, as for example conventional digital television is only a one-way (unidirectional) system.

In general, a broadcast service can be generalized to mean a unidirectional point-to-multipoint service in which data is transmitted from a single source to multiple terminals, e.g. user equipment (UE) in third generation terminology, in the associated broadcast service area. In other words, broadcast services can be called push-type services. On the other hand, a multicast service can be defined as a unidirectional point-to-multipoint service in which data is transmitted from a single source to a multicast group in the associated multicast service area. Only the users that are subscribed to the specific multicast service and have joined the multicast group associated with the service can receive the multicast services. As a difference, a broadcast service can be received without separate indication from the customers. In practice, multicast users need a return channel for the interaction procedures in order to be able to subscribe to the desired services.

MBMS thus can be defined as a unidirectional point-to-multipoint service in which data is transmitted from a single source entity to a group of users in a specific area. As its name indicates, MBMS has two modes in practice: broadcast mode and multicast mode.

In 3GPP a working assumption for the downlink multiple access technology has been taken and it has been agreed to use Orthogonal Frequency Division Multiple Access (OFDMA) based technology in the downlink. OFDM is also being used for systems like Digital Video Broadcast (DVB) and DVB-Handheld (DVB-H). The use of OFDM is well suited in DVB for receiving the same synchronized content from different synchronized transmitters to enable coherent combination of the content.

In UMTS Terrestrial Radio Access Network (UTRAN), MBMS supports two different combining schemes, soft combining for cases where the content is identical, and selection combining when the content is—at least partly—cell specific or not synchronized. In case broadcast services are going to use an OFDM carrier separate from that of the dedicated services, the common MBMS services can be broadcast synchronously in neighbouring or adjacent cells, so that data reception is also possible at cell edges.

However, some broadcast data may be cell specific, localized broadcast data which should be also received at the cell edge. If the neighbour or adjacent cells are broadcasting localized MBMS data independent of each other, it is highly probable that data reception is hardly possible at the cell edge except in case the transmitted data is the same in the neighbouring or adjacent cells. A terminal device in a typical network environment at the cell edge would receive signals from more than one cell and the outcome of the signal combination would be erroneous, as the OFDM receiver cannot cope with signals having different content and being sent in the same time or frequency resource. A normal radio resource management (RRM) functionality is not valid, as the base station does not know the location and path loss of each user for MBMS and consequently the regular interference control means for normal packet data, where different users are given different resources depending on whether they need large power level or not, is not applicable at all for the MBMS case.

One solution to this problem has been suggested in Wideband Code Division Multiple Access (WCDMA) based systems, where a Rake type receiver with cell specific scrambling is provided to demodulate rather easily control information having different content by allocating a finger to the cell and not using any combination of signals from neighbouring cells or multipath propagation.

SUMMARY OF THE INVENTION

It is therefore an object of the present invention to provide an improved transmission method, system and network element which enables proper receipt of local content even at cell edges.

This object is achieved by a method of transmitting a data stream in a point-to-multipoint mode from a source entity to a plurality of users in a predetermined area of a cellular network, said predetermined area comprising a plurality of sub-areas, wherein said method comprises the steps of:
    allocating a predetermined, recurring time period to transmission of localized data specified for users of individual ones of said plurality of sub-areas;
    dividing a transmission capacity of said data stream of said predetermined recurring time period among adjacent sub-areas; and
    transmitting localized data, specified for one of said adjacent sub-areas, during said predetermined, recurring time period using a divided transmission capacity allocated to said one of said adjacent sub-areas.

Furthermore, the above object is achieved by a system for transmitting a data stream in a point-to-multipoint mode from a source entity to a plurality of users in a predetermined area of a cellular network, said predetermined area comprising a plurality of sub-areas, wherein said system comprises:
    allocation means for allocating a predetermined, recurring time period to transmission of localized data specified for users of individual ones of said plurality of sub-areas,
    dividing means for dividing a transmission capacity of said predetermined, recurring time period among adjacent sub-areas for transmitting said data stream; and transceiver means for transmitting localized data, specified for one of said adjacent sub-areas during said predetermined, recurring time period using a divided transmission capacity allocated to said one of said adjacent sub-areas.

Additionally, the above object is achieved by a network element for transmitting a data stream in a point-to-multipoint mode to a sub-area of a predetermined area to which said data stream is directed, said network element comprising:

detecting means for detecting localized data specified for said sub-area;

selecting means for selecting, in response to said detecting means, a divided transmission capacity of said data stream of a predetermined recurring time period allocated to localized data; and transmitting means for transmitting said detected localized data by using said selected divided transmission capacity of said predetermined, recurring time period.

Finally, the above object is achieved by a computer program product comprising code means for generating the above method steps when run on a computer device.

Accordingly, combining of global and local content of a multicast or broadcast service is enabled by avoiding overlapping of transmissions with different contents. Moreover, due to the transmission capacity sharing among adjacent sub-areas, local content from two or more different cells can be received at a cell edge, as the cells can transmit their content at different transmission capacity portions in the time domain or frequency domain or any other suitable multiplex domain.

The predetermined time period may correspond to predetermined fixed time slots allocated to the localized data.

The transmission capacity can be divided by defining a predetermined time pattern based on which transmission times are allocated to individual ones of the adjacent sub-areas using the predetermined time period. This time pattern may comprise at least one discontinuous transmission period. Thereby, downlink interference can be reduced.

It is however noted, that the sharing or division of transmission capacity not necessarily has to be performed in the time domain, but can be performed in other suitable domains which ensure that mutual transmission interference can be prevented or suppressed. As an example, different frequency sub-channels, codings or other capacity sharing principles can be used.

As a specific example of capacity division in the time domain, the time pattern may consist of four sub-periods, wherein transmission is turned off for one sub-period and turned on for three sub-periods. According to another specific example of capacity division in the time domain, instead of turning transmission off, the time pattern may be used for replacing the multicast/broadcast content with point-to-point (unicast) data being sent at lower power level than the broadcast or multicast service.

Further advantageous modifications are defined in the dependent claims.

BRIEF DESCRIPTION OF THE DRAWINGS

In the following, the present invention will be described in greater detail based on a preferred embodiment with reference to the accompanying drawings, in which.

DESCRIPTION OF THE PREFERRED EMBODIMENT

The preferred embodiment will now be described based on an MBMS service in which global and local content is forwarded with an OFDM transmission scheme.

Figure 1:
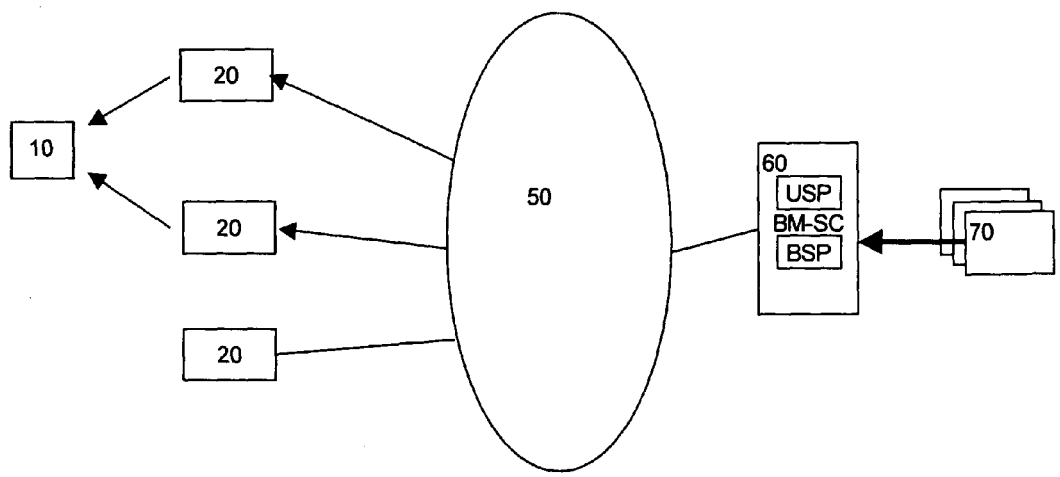
FIG. 1 shows a schematic block diagram of an MBMS architecture in which the present invention can be implemented.

FIG. 1 shows a schematic block diagram of an MBMS architecture in which the preferred embodiment can be implemented.

According to FIG. 1, content sources 70, such as Internet servers or the like, supply MBMS content to a broadcast multicast service center (BM-SC) 60. The BM-SC 60 provides MBMS user service, i.e., delivering service data and performing related control actions. Thus, the BM-SC 60 comprises functions for MBMS user service provisioning and delivery. It may serve as an entry point for content provider MBMS transmissions, used to authorize and initiate MBMS bearer services within the cellular network, and can be used to a schedule and deliver MBMS transmissions. Among other functions, the BM-SC 60 is able to schedule MBMS session retransmissions, and label each MBMS session with an MBMS session identifier to allow user equipments (UEs) 10 to distinguish MBMS session retransmissions. These retransmissions are transparent to the radio access network and MBMS user service (MBMS-US).

The MBMS-US covers applications for delivering content data to many users, e.g. news services, audio or video clips, etc. It is to a large extent independent from the user transport services, as long as IP multicast is compatible. Moreover, MBMS-US provides means for user authorization, charging and quality of service (QoS) improvement and prevents unauthorized reception by encryption or digital rights management (DRM). On the other hand, the MBMS-BC provides an IP multicast like transport service for MBMS user services. It maintains a one to many data distribution tree into all necessary radio cells and may provide transport related charging.

Each UE 10 comprises a user service part (USP) for handling application signaling of MBMS-US and a bearer service part (BSP) for handling MBMS-BC signaling. Similarly, the BM-SC 60 comprises a USP for application signaling and a BSP for bearer control signaling.

The data stream with the MBMS content is delivered via an access gateway 50, such as an Enhanced UTRAN (E-UTRAN) Access Gateway (aGW) and a radio access network (RAN) part to the respective ones of the UEs 10. The RAN part comprises base station devices 20, e.g. a node B or base transceiver station (BTS), for providing an air interface for radio transmission to respective UEs 10 within their areas of coverage In the example shown in FIG. 1, the MBMS content is not delivered to one of the base station devices 20, which may be outside the area specified for the actually transmitted MBMS content.

According to the preferred embodiment, a certain amount of transmission capacity is reserved in the time domain inside the sub-carriers allocated for the MBMS services, in order to broadcast or multicast localized broadcast data dedicated to a specific cell areas. The capacity of these time slots is divided among the broadcast cells, which are neighbours to each other, so that these neighbouring or adjacent cells do not transmit at the same time during those fixed time slots. In the present implementation example of the preferred embodiment, this capacity sharing or dividing is based on a time sharing or time division concept, which is however just one example and may be replaced by other capacity sharing options, such as frequency sharing code sharing or the like.

In the preferred embodiment, a common RRM function or network planning may define a predetermined time slot for transmission of such localized content and may add an information or flag indicating localized content e.g. with a service area ID, so that the localized content can be routed to the correct base station device 20 which uses a predetermined divided time portion of the dedicated time slot for transmission of the localized content.

The resource for local control and content can be reserved regardless whether the MBMS content is multiplexed in a frequency division multiple access (FDMA) or time division multiple access (TDMA) scheme with other services. I.e., the same carrier may be shared or a separate carrier may be used for other services. The problem to be solved is present in both cases.

Figure 2:
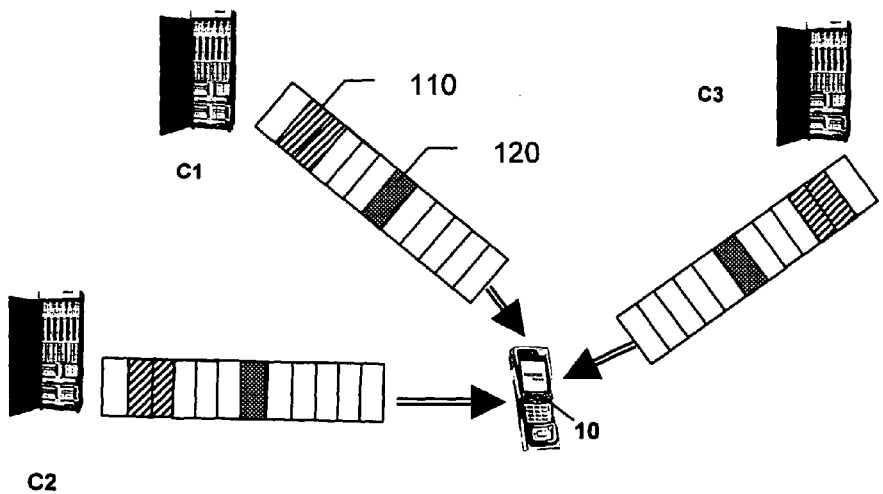
FIG. 2 shows a schematic diagram indicating resource division between global and local content according to the preferred embodiment.

FIG. 2 shows a schematic diagram indicating resource division between MBMS global and local content in the time domain. Base station devices of different adjacent cells C1, C2 and C3 transmit their MBMS data indicated by a chain or sequence of rectangular boxes to the UE 10. In the example of FIG. 2, two adjacent time slots 110 are provided for global MBMS content, while a predetermined fixed time slot 120 is provided for local content or localized data. These time slots are recurring at different timings depending on the frame pattern of the TDMA transmission scheme. Thus, the other time slots in FIG. 2 may be reserved for other services.

During the time slots of global MBMS content, no discontinuous trans-mission (DTX) may be used, as all adjacent cells transmit the same MBMS content. However, during time slot 120 for local MBMS content, a DTX pattern may be used to ensure that downlink interference situation is not static. DTX is a method of momentarily powering-down, or muting transmission when there is no data input to be transmitted. This optimizes overall efficiency of wireless transmissions.

According to a particular example, a pattern may be defined for the different cells C1 to C3, which determines when they are allowed to transmit local content in the cell-specific resource, so that transmission timing is different for each cell. This pattern may also consist of a DTX period. A simple pattern of three out of four periods on and one out of four periods off would for example ensure that each dominant interferer is silent during one transmission period out of three periods of the local content, while during one transmission period the cell itself would be silent. However, other timing patterns may as well be employed as long as mutual interference can be suppressed.

Thereby, combination of global and local MBMS content in an OFDM based broadcast system can be enabled by avoiding (continuous) overlapping of high power transmissions with different content. Also, local content from two or more different cells can be received at a cell edge, as the cells transmit their content according to a predetermined timing pattern or other multiplex scheme.

Figure 3:
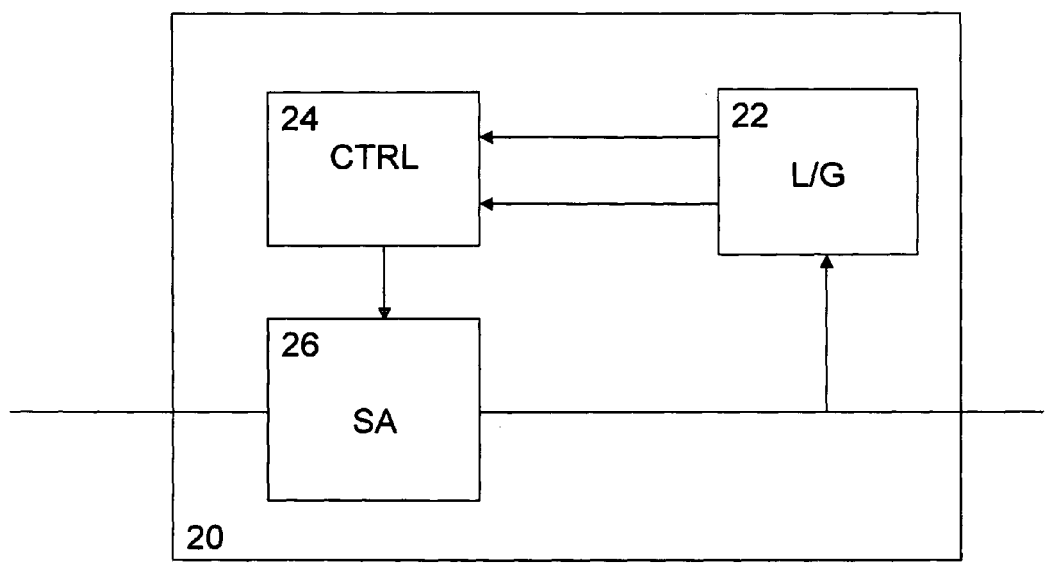
FIG. 3 shows a schematic block diagram of a network element according to the preferred embodiment.

FIG. 3 shows a schematic block diagram of a network element, such as the base station device 20, in which the predetermined time pattern within the local time slot is selected and controlled.

According to FIG. 3, a data downlink stream received at the right input of the main box of FIG. 3 is checked by a content detection or discrimination unit or function 22 which may be configured to extract MBMS content from the received downlink data stream and two forward separated local and global content data to a transmission control unit or function 24. The transmission control function 24 controls a slot allocation unit or function 26 so as to transmit global MBMS content within the time slots 110 of FIG. 2 and local MBMS content within the time slot 120 of FIG. 2. However, in the local time slot 120, the time slot is not used for transmission of the local content every time it occurs, but only on predetermined times defined by the transmission pattern used by the adjacent cells C1 to C3, such that only one of the respective base station devices 20 transmits at a time. Moreover discontinuous transmission period(s) may be introduced, as indicated above.

It is noted that the functional block diagram of FIG. 3 may be implemented as discrete hardware units or may indicate subroutines controlling a single processor device used for processing the downlink data stream.

In summary, a method, system, network element and computer program product have been described, which are used for transmitting a data stream in a point-to-multipoint mode from a source entity to a plurality of users in a predetermined area of a cellular network, said predetermined area comprising a plurality of sub-areas. A predetermined recurring time period is allocated to transmission of localized data specified for users of individual ones of said plurality of sub-areas, and a transmission capacity of the data stream is divided using said recurring predetermined time period among adjacent sub-areas. Localized data is then transmitted during the predetermined time period using a divided transmission capacity allocated to the respective sub-area. Thereby, combination of global and local broadcast or multicast content is enabled in a broadcast system by avoiding overlapping of transmissions with different content at cell edges.

The present invention is not restricted to the above predetermined embodiment and the specific time pattern for sharing or dividing transmission capacity during the local content time slot 120. Moreover, the present invention is not restricted to the MBMS service but can be used for any multicast or broadcast service where area-specific content is to be transmitted to selected areas. It is again pointed out that any other capacity sharing or division can be used for preventing interference between adjacent cells in which different content is transmitted. The preferred embodiments may thus vary within the scope of the attached claims.

The invention claimed is:

1. A method, comprising:
   allocating a predetermined recurring time period to transmission of localized data specified for users of individual ones of a plurality of sub-areas;
   dividing a transmission capacity of a data stream of said predetermined recurring time period among adjacent sub-areas; and
   transmitting localized data specified for one of said adjacent sub-areas during said predetermined recurring time period using a divided transmission capacity allocated to one of said adjacent sub-areas,
   wherein said transmission capacity is divided by defining a predetermined time pattern based on which transmission times for said localized data are allocated to individual ones of said adjacent sub-areas during said predetermined recurring time period, and
   wherein said predetermined time pattern, based on which transmission times for said localized data are allocated, comprises at least one discontinuous transmission period.

2. The method according to claim 1, wherein said predetermined recurring time period corresponds to predetermined fixed time slots allocated to said localized data.

3. The method according to claim 1, wherein said time pattern comprises at least one transmission period used to replace multicast/broadcast content with data being sent at lower power level than a broadcast or multicast service.

4. The method according to claim 1, wherein said data stream is generated from a mobile broadcast or multicast service.

5. A non-transitory computer-readable storage medium encoded with instructions configured to control a processor to perform a process, the process comprising:
   allocating a predetermined recurring time period to transmission of localized data specified for users of individual ones of a plurality of sub-areas;
   dividing a transmission capacity of a data stream of said predetermined recurring time period among adjacent sub-areas; and
   transmitting localized data specified for one of said adjacent sub-areas during said predetermined recurring time period using a divided transmission capacity allocated to one of said adjacent sub-areas,
   wherein said transmission capacity is divided by defining a predetermined time pattern based on which transmission times for said localized data are allocated to individual ones of said adjacent sub-areas during said predetermined recurring time period, and
   wherein said predetermined time pattern, based on which transmission times for said localized data are allocated, comprises at least one discontinuous transmission period.

6. An apparatus, comprising:
   a processor; and
   a memory including computer program code,
   the memory and the computer program code configured to, with the processor, cause the apparatus at least to
   allocate a predetermined recurring time period to transmission of localized data specified for users of individual ones of a plurality of sub-areas,
   divide a transmission capacity of said predetermined recurring time period among adjacent sub-areas to transmit a data stream,
   transmit localized data, specified for one of said adjacent sub-areas, during said predetermined recurring time period using a divided transmission capacity allocated to one of said adjacent sub-areas,
   divide said transmission capacity by defining a predetermined time pattern based on which transmission times for said localized data are allocated to individual ones of said adjacent sub-areas during said predetermined recurring time period, and
   provide at least one discontinuous transmission period during said predetermined time pattern based on which transmission times for said localized data are allocated.

7. The apparatus according to claim 6, wherein the memory and the computer program code are further configured to, with the processor, cause the apparatus at least to allocate predetermined fixed time slots to said transmission of said localized data.

8. The apparatus according to claim 6, wherein the memory and the computer program code are further configured to, with the processor, cause the apparatus at least to provide at least one transmission period used to replace multicast/broadcast content with data being sent at lower power level than a broadcast or multicast service.

9. The apparatus according to claim 7, further comprising a broadcast multicast service center to generate said data stream.

10. An apparatus, comprising:
    a processor; and
    a memory including computer program code,
    the memory and the computer program code configured to, with the processor, cause the apparatus at least to
    detect localized data specified for a sub-area,
    select, in response to said detecting, a divided transmission capacity of a data stream of a predetermined recurring time period allocated to localized data,
    transmit said detected localized data by using said selected divided transmission capacity of said predetermined time period,
    transmit said localized data at transmission times allocated based on a predetermined time pattern during said predetermined recurring time period, and
    provide at least one discontinuous transmission period during said predetermined time pattern based on which transmission times for said localized data are allocated.

11. The apparatus according to claim 10, wherein the memory and the computer program code are further configured to, with the processor, cause the apparatus at least to provide at least one transmission period during said time pattern used to replace multicast/broadcast content with data being sent at lower power level than a broadcast or multicast service.

12. The apparatus according to claim 10, wherein said apparatus is a base station device.

13. A method, comprising:
    detecting localized data specified for a sub-area;
    selecting, in response to said detecting, a divided transmission capacity of a data stream of a predetermined recurring time period allocated to localized data;
    transmitting said detected localized data by using said selected divided transmission capacity of said predetermined time period;
    transmitting said localized data at transmission times allocated based on a predetermined time pattern during said predetermined recurring time period; and
    providing at least one discontinuous transmission period during said predetermined time pattern based on which transmission times for said localized data are allocated.

14. The method according to claim 13, further comprising providing at least one transmission period during said time pattern used to replace multicast/broadcast content with data being sent at lower power level than a broadcast or multicast service.

15. The method according to claim 13, wherein said method is performed by a base station device.

16. A non-transitory computer-readable storage medium encoded with instructions configured to control a processor to perform a process, the process comprising:
    detecting localized data specified for a sub-area;
    selecting, in response to said detecting, a divided transmission capacity of a data stream of a predetermined recurring time period allocated to localized data;
    transmitting said detected localized data by using said selected divided transmission capacity of said predetermined time period;
    transmitting said localized data at transmission times allocated based on a predetermined time pattern during said predetermined recurring time period; and
    providing at least one discontinuous transmission period during said predetermined time pattern based on which transmission times for said localized data are allocated.

* * * * *